Figure 1:
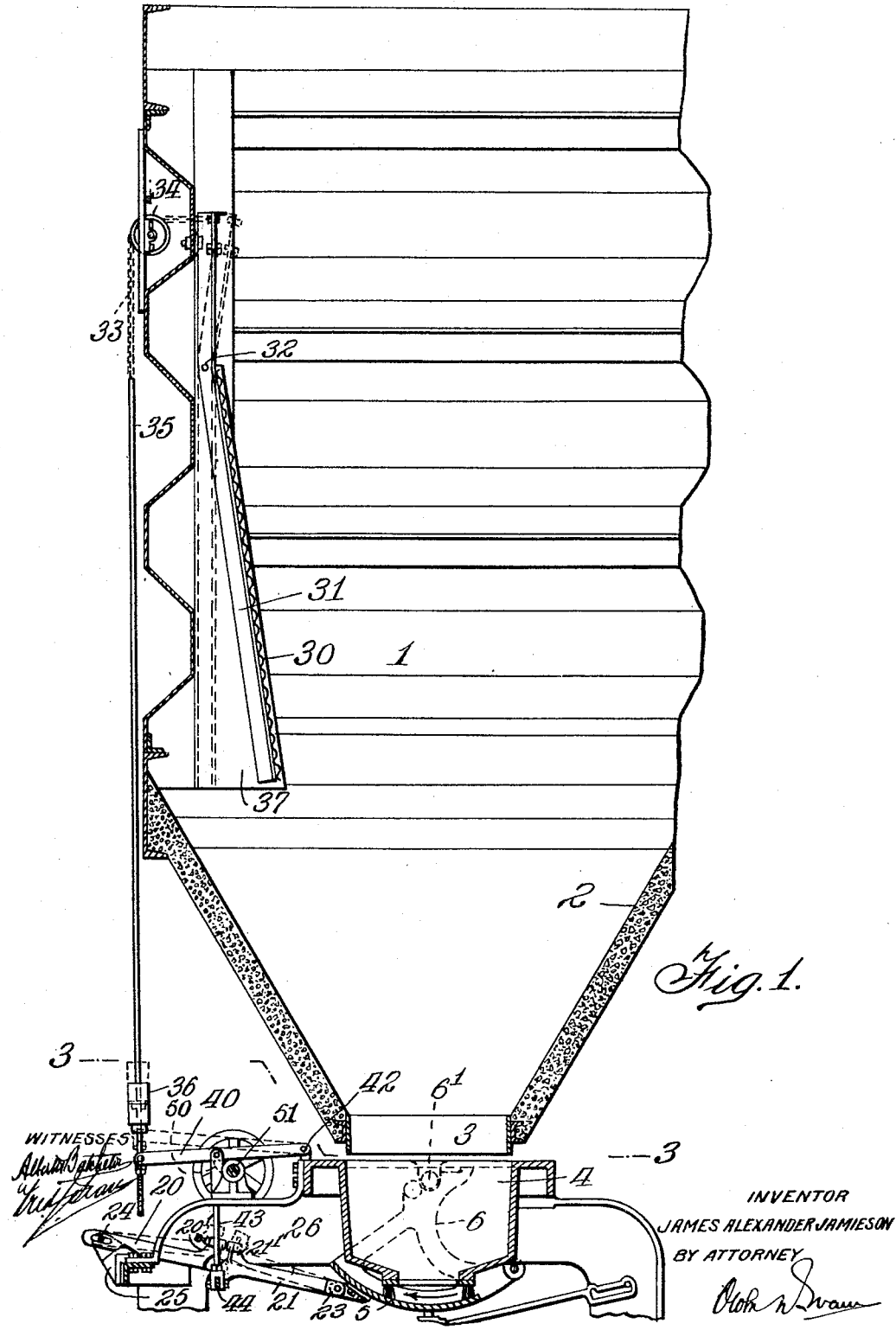

J. A. JAMIESON.
FEED CONTROL DEVICE FOR AUTOMATIC WEIGHING MACHINES.
APPLICATION FILED FEB. 28, 1912.

1,148,845.

Patented Aug. 3, 1915.
3 SHEETS—SHEET 1.

INVENTOR
JAMES ALEXANDER JAMIESON
BY ATTORNEY

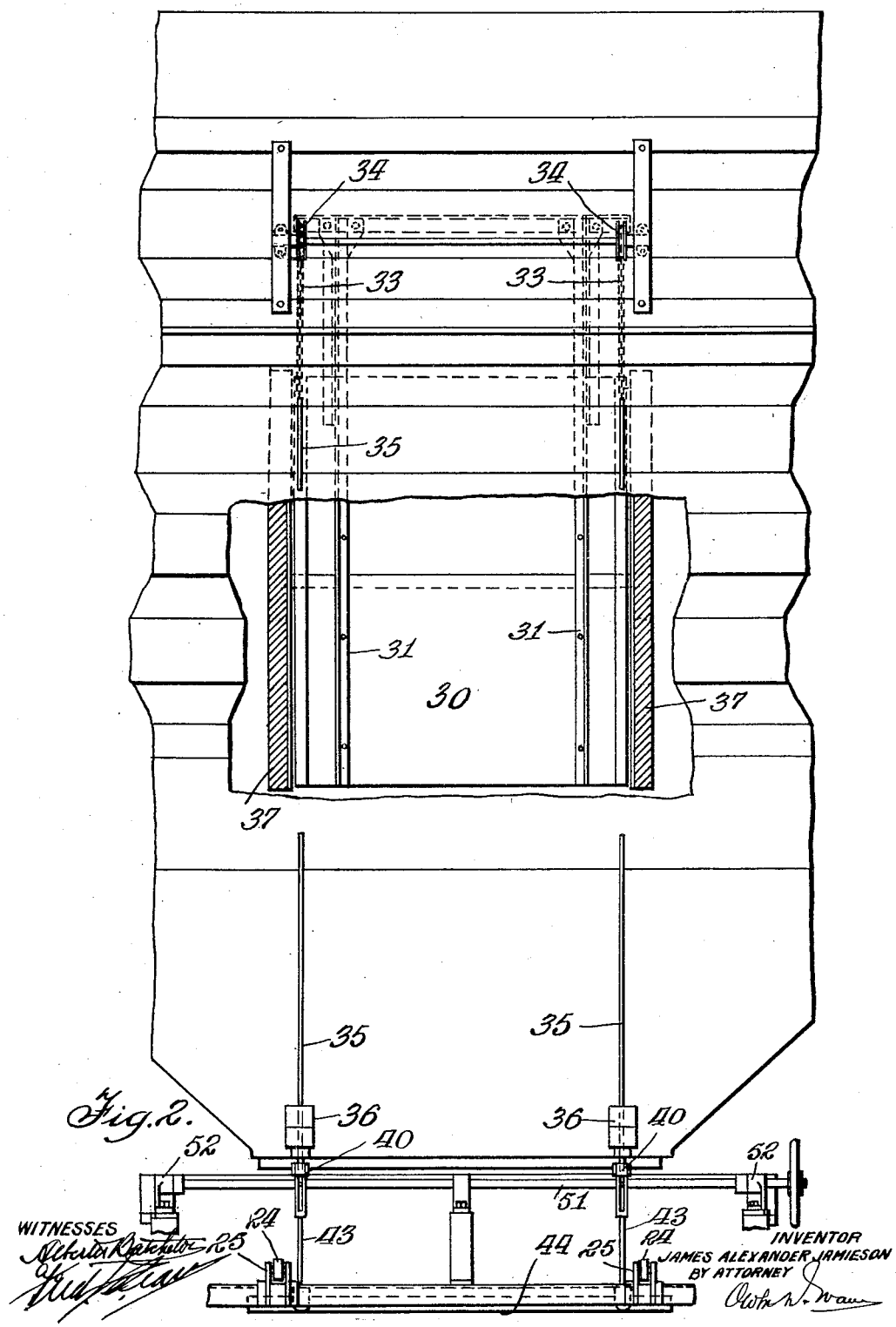

J. A. JAMIESON.
FEED CONTROL DEVICE FOR AUTOMATIC WEIGHING MACHINES.
APPLICATION FILED FEB. 28, 1912.
1,148,845.
Patented Aug. 3, 1915.
3 SHEETS—SHEET 3.
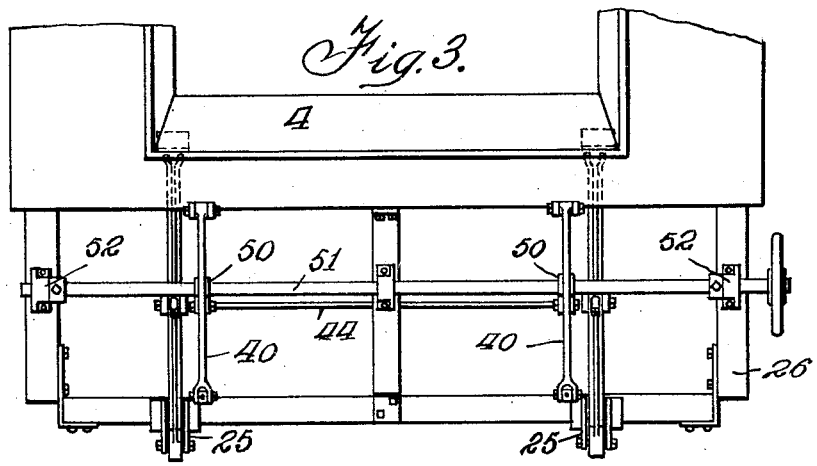
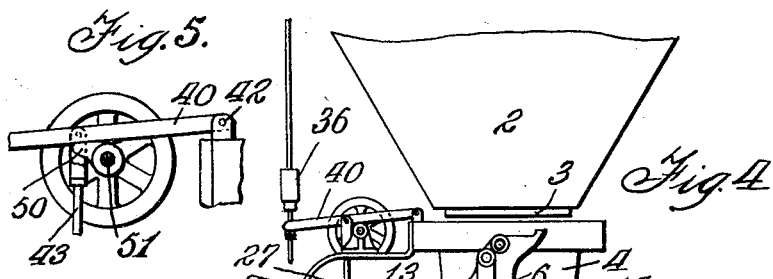
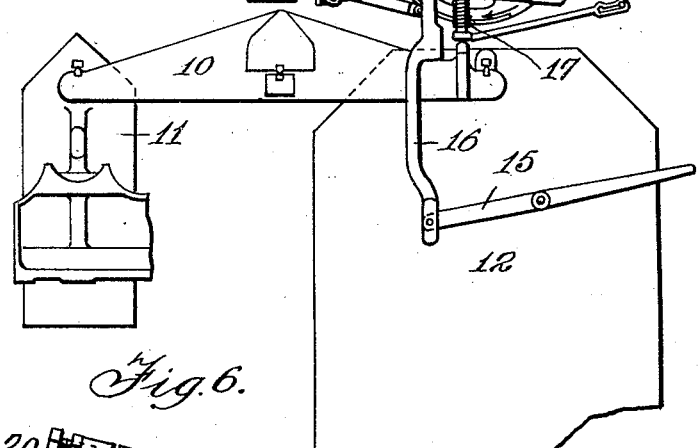
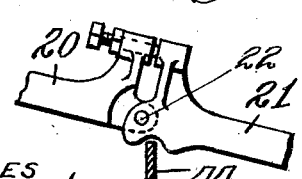
WITNESSES
INVENTOR
JAMES ALEXANDER JAMIESON
BY ATTORNEY

UNITED STATES PATENT OFFICE.

JAMES ALEXANDER JAMIESON, OF MONTREAL, QUEBEC, CANADA.

FEED-CONTROL DEVICE FOR AUTOMATIC WEIGHING-MACHINES.

1,148,845. Specification of Letters Patent. Patented Aug. 3, 1915.

Application filed February 28, 1912. Serial No. 680,489.

*To all whom it may concern:*

Be it known that I, JAMES ALEXANDER JAMIESON, of the city of Montreal, in the Province of Quebec, Canada, have invented certain new and useful Improvements in Feed-Control Devices for Automatic Weighing-Machines; and I do hereby declare that the following is a full, clear, and exact description of the same.

This invention relates more particularly to a means for controlling the inlet gates of automatic scales through which the material to be weighed is fed to the scale hopper, and it is intended especially for application to automatic scales or machines for weighing grain, or other granular or comminuted material.

In the usual operation of machines of this type the material to be weighed is fed or discharged into the scale hopper from a supply garner having its outlet opening directly above the scale and controlled by a gate operated in an intermittent manner by the scale mechanism and commonly known as the inlet gate of the scale, the material being discharged into the supply garner by elevating or conveying or other suitable means. When the hopper is nearly full the reduced upward pressure of the usual spring device on the scale permits the gate to swing nearly closed, a small opening, commonly known as the "dribble" port, being left open through which the material runs in a small stream or "dribble" until the scale reaches an equilibrium when the inlet gate closes entirely and locks in this position.

Heretofore the inlet gate to the scale has been adapted to open immediately following the discharge of each load or weighing from the scale hopper with the result that when the material is not being supplied to the garner at a rate equal to the capacity of the scale, the material will flow directly through the garner into the scale, causing a tendency to inaccuracy due to the velocity with which the material falls into the hopper through the dribble port as the scale is coming to the balance, and also discharging large quantities of dust into the surrounding atmosphere.

It is an object of this invention to obviate such disadvantages by providing a means adapted to retain the said gate in a closed position when the supply of grain or other material in the hopper is below a certain minimum so that a reserve supply will always be maintained in the garner, upon which the fresh material supplied to the garner will be discharged and which forms a seal for preventing the escape of dust.

The invention comprises briefly a locking device applied to the inlet gate to a scale hopper and releasable by means adapted to be actuated by the material within the supply garner.

For full comprehension, however of the invention reference will be had to the accompanying drawings forming part of this specification in which similar reference characters indicate the same parts and wherein—

Figure 1 is a vertical sectional view of the supply garner and the inlet gate of the scale showing my invention applied thereto; Fig. 2 is a front elevation thereof, partly broken away; Fig. 3 is a horizontal section taken on the line 3 3 Fig. 1; Fig. 4 is a diagrammatic view illustrating the relation of the device to the scale; Fig. 5 is a detail view of a portion of the toggle lock illustrating particularly the connection of the toggle links to one another; and Fig. 6 is a detail view of the manually operable device for releasing the lock.

The supply garner is shown at 1 in the drawings, with its lower portion tapering downwardly as at 2 to the discharge opening 3. This opening is located directly above an open-topped chamber 4 mounted upon the scale and which forms, when the scale is in position, a continuation of the supply garner, this chamber having at its lower end the inlet gate 5 to the scale hopper 12. This gate is of the radial swinging gravity closing type and is mounted in the lower ends of arms 6 pivoted as at 6′ to the top of the chamber 4, the gate swinging open in the direction indicated by the arrows in Figs. 1 and 4.

Sufficient of the scale to show the relation of my invention thereto is illustrated diagrammatically in Fig. 4, the beam of the scale being shown at 10, the counterweight at 11 and the scale hopper at 12. The toggle links by which the inlet gate to the scale hopper is locked in closed position while the discharge gate in the bottom of the hopper is open are shown at 13 and 14.

At 15 is indicated the lever, actuated by suitable mechanism (not shown) for breaking the toggle lock, the thrust bar connecting the lever to the toggle links being shown at 16.

17 indicates the resilient device connected at one end to the arms 6 of gate 5 and adapted to be borne upon by the scale beam to open the said gate when the toggle is unlocked, or "broken."

The parts above described are of well known construction and further detail reference thereto and to the scale mechanism is not considered necessary for the proper comprehension of the invention.

I do not wish to be understood however as limiting my invention to application to the particular type of scale indicated in the drawings as it is not essential for the proper operation of my invention that the gate should be actuated by any specified mechanism.

During weighing operations of the scale (assuming the gate to be open) when the beam comes to the balance the gate is closed and the toggle links 13, 14 come down to locking position and remain in such position until the load is discharged, immediately upon which, as the scale hopper rises, the lever 15 acts through the thrust bar 16 to "break" the lock, the weight of the counterpoise, acting through the beam upon the device 17, imparting to the gate a normal tendency to swing open.

To prevent the gate from being swung open in case the supply of grain in the garner has fallen below a certain minimum I provide a supplementary lock adapted to retain the gate closed against the action of the device 17 after the lock on the scale has been "broken."

In the preferred embodiment of my invention the locking device comprises one or more pairs of toggle links 20, 21 pivotally connected to one another at adjacent ends as at 22 and having their opposite ends connecting respectively by a pivotal connection 23 to the gate 5 and by a slot and pin connection 24 to a bracket or support 25 upon the frame 26 of the scale. When the lock is in action these toggle links assume a substantially horizontal position with the point 22 slightly below a straight line drawn through the points 23, 24, or slightly below "dead center" position, being prevented from going too far beyond the center by angular arms 20', 21' projecting therefrom adjacent the point 22, one of such arms being bored and tapped to receive a screw 27 the end of which is adapted to bear against the other arm.

The preferred means for releasing the toggle lock comprises a lever device within the garner consisting of a diaphragm 30 mounted on the lower ends of a pair of angular levers 31 pivoted adjacent the bends therein to the inner face of the garner wall as at 32 and having chains 33 or other suitable members attached to the tops thereof and passing through suitable openings in the garner wall and over idler pulleys 34 mounted on the outside of the latter and having rods 35 suspended from their opposite ends.

These rods 35 have weights 36 thereon adapted through their actions on the levers 31 to cause the diaphragm to normally assume a position inclining downwardly away from the wall of the garner.

Vertical webs or partitions 37 project inwardly from the wall of the garner at the sides of the diaphragm to prevent the grain getting behind the latter and interfering with its free swinging. A suitable operative connection is effected between the rods 35 and the toggle links to cause the upward movement of the rods to swing the point 22 above the dead-center position and "break" the lock.

As here shown a pair of lever arms 40 are connected at one end to the lower ends of the rods 35 and are pivoted at their opposite ends as at 42 to the scale frame 26, these levers having suspended therefrom midway between their ends links 43 carrying in their lower ends a horizontal trip bar 44 whose ends project under the toggle links adjacent the points 22.

To allow the garner to be completely emptied when desired the locking device may be thrown out of action by means of cams 50 rigid on a shaft 51 mounted in bearings 52 on the frame 26, these cams being located underneath the lever arms 40 and adapted to bear on the latter and raise them (and with them the links 43 and bar 44) and thus "break" the lock, the slot and pin connection 24 permitting of this movement of the links.

Operation: Assuming the gate to be open, when the scale hopper falls the gate closes by gravity (although the precise means by which the gate is closed has nothing to do with this invention). As long as there remains sufficient supply of grain in the garner to cause the pressure thereof, acting laterally upon the diaphragm 30 to overbalance the weights 36 the links will be prevented by the bar 44 from dropping to locking position and consequently the gate will open as soon as the usual toggle lock 13, 14 is "broken" and the beam of the scale bears against the device 17. Should, however, the supply of material in the garner after a weighing not be sufficient to act upon the diaphragm and overbalance the weights 36, as would be the case if the material was being supplied to the garner at a lesser rate than the weighing capacity of the scale, the rods 35 would fall and with them the lever arms 40, links 43 and cross bar 44, and the links 20, 21 would drop to locking position when the gate closed as the scale came to the balance and hold the gate closed against upward pressure of the beam of the scale on the device 17 until the grain had accumulated in the hopper sufficiently to overbalance the weights and cause the bar 44 to be raised and "break" the lock.

What I claim is as follows:

1. In a device of the character set forth, the combination with a scale hopper and a garner having an opening for delivering material to the scale hopper, of a gate for closing such opening, a toggle link locking device applied to such gate and comprising a pair of toggle links adapted to assume substantially dead center position when the gate is closed and means adapted to be actuated by the material within the garner for controlling the locking device.

2. In a device of the character set forth, the combination with a scale hopper and a garner having an opening for delivering material to the scale hopper, of a gate for closing such opening, a toggle link locking device applied to such gate and comprising a pair of toggle links adapted to assume substantially dead center position when the gate is closed, a lever device within the garner adapted to be actuated by the material therein and means operatively connecting the lever device to the locking device.

3. In a device of the character set forth, the combination with a scale hopper and a garner having an opening for delivering material to the scale hopper, of a gate for closing such opening, a device for locking such gate, a lever device within the garner, such lever device including a diaphragm adapted to be acted upon by the material in the garner and means operatively connecting the lever device to the locking device.

4. In combination, a supply garner, a gate controlling the latter, a pair of toggle links pivotally connected together and respectively to the gate and a fixed part, devices carried by such links and adapted to retain the latter in substantially dead center position, and means within the garner and adapted to be actuated by the material therein for moving such links from dead center position.

5. In combination, a supply garner, a gate controlling the latter, a pair of toggle links connected pivotally together and respectively to the gate and a fixed part, devices carried by such links and adapted to retain the latter in substantially dead center position, means for effecting a relative adjustment of such devices, and means within the garner and adapted to be actuated by the material therein for moving such links from dead center position.

6. In combination, a supply garner, a gate controlling the latter, a pair of toggle links pivotally connected together and respectively to the gate and a fixed part, a pair of arms projecting one from each of such links adjacent their point of connection to one another, an adjusting screw carried by one of such arms and adapted to bear against the other, means normally retaining such toggle links in locking position, a device located adjacent to such links for moving them from locking position, and means within the garner adapted to be actuated by the material therein and operatively connected to the said means and the said device, for the purpose set forth.

7. In a device of the character set forth, the combination with a scale hopper and a garner having an opening for delivering material to the scale hopper, of a gate for closing such opening, a locking device applied to such gate, means adapted to be actuated by the material within the garner for releasing said locking device and means normally holding the first mentioned means out of engagement with the locking device.

8. In a device of the character set forth, the combination with a scale hopper and a garner having an opening for delivering material to the scale hopper, of a gate for closing such opening, a locking device applied to such gate, means adapted to be actuated by the material within the garner for releasing the locking device and a weighted member normally holding said releasing means out of engagement with the locking device.

9. In a device of the character set forth, the combination with a scale hopper and a garner having an opening for delivering material to the scale hopper, of a gate for closing such opening, a locking device applied to such gate and means adapted to be actuated by the material within the garner for releasing the locking device, such means including a diaphragm located within the garner and means effecting an operative connection between the diaphragm and locking device.

10. In a device of the character set forth, the combination with a scale hopper and a garner having an opening for delivering material to the scale hopper, of a gate for closing such opening, a locking device applied to such gate and means adapted to be actuated by the material within the garner for releasing the locking device, such means including a diaphragm within the garner adapted to swing toward and away from one of the walls thereof, means effecting an operative connection between the diaphragm and locking device and means applied to the last mentioned means to normally retain the diaphragm away from said wall.

11. In a device of the character set forth, the combination with a supply garner having an outlet opening, and a gate controlling such opening, of a locking device applied to such gate, and means adapted to be actuated by the material within the said garner for releasing the said device, such means including diaphragm within the garner adapted to swing toward and away from one of the walls thereof, partitions extending from the said wall at each side of the diaphragm, means effecting an operative connection between the diaphragm and locking device, and means applied to the last mentioned means to normally retain the diaphragm away from the said wall.

12. In a device of the character set forth, the combination with a scale hopper and a garner having an opening for delivering material to the scale hopper, of a gate for closing such opening, a pair of toggle links pivotally connected together and respectively to the gate and a fixed part, such links being adapted to normally assume substantially dead center position when the gate is closed, a trip member projecting under the links, a weighted member extending upwardly adjacent to the garner, means operatively connecting the weighted member and trip member, a lever device within the garner adapted to be actuated by the material therein and means operatively connecting the lever device and weighted member.

13. In a device of the character set forth, the combination with a scale hopper and a garner having an opening for delivering material to the scale hopper, of a gate for closing such opening, a plurality of pairs of toggle links pivotally connected together and respectively to the gate and a fixed part, such links being adapted to normally assume substantially dead center position when the gate is closed, a trip bar projecting under the links at opposite ends, a plurality of weighted rods extending upwardly adjacent to the garner, means operatively connecting the weighted rods and trip bar, a plurality of angular levers within the garner and fulcrumed between their ends to one of the walls thereof, a diaphragm carried by the lower ends of the levers and flexible members connecting the opposite ends of the levers to the upper ends of the weighted rods.

14. In a device of the character set forth, the combination with a scale hopper and a garner having an opening for delivering material to the scale hopper, of a gate for closing such opening, a locking device for the gate, means adapted to be acted upon by the material within the garner for releasing such locking device and means adapted for manual control whereby the locking device may be released.

In testimony whereof, I have signed my name to this specification, in the presence of two subscribing witnesses.

JAMES ALEXANDER JAMIESON.

Witnesses:
ALEX CURRIE,
JOHN N. O'KEEFE.

Copies of this trade-mark may be obtained for five cents each, by addressing the "Commissioner of Patents, Washington, D. C."